US011927050B2

(12) United States Patent
Boer

(10) Patent No.: US 11,927,050 B2
(45) Date of Patent: Mar. 12, 2024

(54) WINDOW ASSEMBLY AND FITTING THEREFOR

(71) Applicant: Elton Manufacturing, a division of Ontario Door Sales Ltd., Milton (CA)

(72) Inventor: Anthonie Boer, Campbellville (CA)

(73) Assignee: Elton Manufacturing, Milton (CA)

( * ) Notice: Subject to any disclaimer, the term of this patent is extended or adjusted under 35 U.S.C. 154(b) by 143 days.

(21) Appl. No.: 17/501,825

(22) Filed: Oct. 14, 2021

(65) Prior Publication Data

US 2022/0120132 A1 Apr. 21, 2022

Related U.S. Application Data

(60) Provisional application No. 63/092,200, filed on Oct. 15, 2020.

(51) Int. Cl.
*E06B 3/54* (2006.01)
*E06B 3/58* (2006.01)

(52) U.S. Cl.
CPC ............ *E06B 3/549* (2013.01); *E06B 3/5821* (2013.01); *E06B 3/5878* (2013.01)

(58) Field of Classification Search
CPC ........ E06B 1/26; E06B 1/6061; E06B 1/6063; E06B 3/549; E06B 3/5821; E06B 3/5878; E06B 3/5892
See application file for complete search history.

(56) References Cited

U.S. PATENT DOCUMENTS

| | | | | | |
|---|---|---|---|---|---|
| 9,038,335 | B1 * | 5/2015 | Eck | E06B 1/6061 | 52/204.597 |
| 2004/0068942 | A1 * | 4/2004 | Krochmal | E06B 3/5892 | 52/212 |
| 2004/0083678 | A1 * | 5/2004 | Tumlin | E06B 3/5892 | 52/205 |
| 2005/0016091 | A1 * | 1/2005 | Chen | E06B 3/5892 | 52/204.5 |
| 2010/0251635 | A1 * | 10/2010 | Barnard | E06B 3/485 | 52/745.15 |
| 2015/0159421 | A1 * | 6/2015 | Eck | E06B 1/6053 | 52/204.591 |

* cited by examiner

*Primary Examiner* — Christine T Cajilig
(74) *Attorney, Agent, or Firm* — Smart & Biggar LP

(57) ABSTRACT

A window frame assembly includes a pair of identical half-frames that can be reversed to mate with each other, with glazing trapped between them. The half-frames are unitary plastic moldings. They include respective arrays of securement fittings that include both male and female fittings. The half-frames have a primary mold opening and closing direction. The securement fittings are formed with transversely moving mold inserts that form the interlocking barbed one-way engagement profiles of the securement fittings. The frames include externally facing surfaces that are free of external fastening hardware. The molded half-frames have abutment stops the prevent over-engagement. They also have window bezels that for a flange relative to the external fascia profile. There is a separate internal peripheral wall stem, to which the male and female fittings abut.

23 Claims, 8 Drawing Sheets

WINDOW ASSEMBLY AND FITTING THEREFOR

This Application claims the benefit of priority of U.S. Provisional Patent Application 63/092,200 filed Oct. 14, 2020, the specification and drawings thereof being incorporated in their entirety herein by reference.

FIELD OF THE INVENTION

This invention relates to the field of window frames having securement fittings.

BACKGROUND OF THE INVENTION

Window assemblies may include mating inside and outside framing members, or half-frames that mate to a wall or door penetration, and that capture and support a glazing element, such as a window. It is helpful to install the half-frames, and the glazing, with ease, efficiency and consistency in respect of quality. Plastic moldings are sometimes used for this purpose. They are secured using mechanical fasteners such as screws or bolts. However, the installation of mechanical fasteners depends on the skill and care of the installer. Mechanical fasteners may be over-driven which may result both in inconsistent force being applied or damage to the plastic part themselves. Furthermore, the use of mechanical fasteners often includes sockets or countersinks, or penetration in the external, visible facing of the window frame members that must then be covered or concealed. In each case, more consistent results may be achieved where the process of installation is less dependent upon human skill, where the closure is limited, or where the fastening does not affect the external appearance of the installed assembly.

SUMMARY OF THE INVENTION

In an aspect of the invention there is a window frame. It has a pair of unitary molded window half-frames. The half-frames are the same. When one is reversed and rotated relative to the other, they can be snapped together without mechanical fasteners such as screws. In use, the half-frames surround glazing and mount to adjacent inside and outside faces of a wall structure. They have one-way engagement molded plastic engagement fittings. The half-frames have a molding direction that is normal to the opening for the window glazing. The engagement fittings have barbed engagement profiles that are formed with molded inserts that move in directions of formation that are perpendicular to the main direction of formation of the mold.

In another aspect the window frame member has a one-piece molding defining first and second spaced apart transverse members and first and second upright members. The upright members and the transverse members co-operate to form a first four-sided half-frame. It has an outside with an external facing, or fascia, and an inside. The inside has an array of molded securement fittings. The molded securement fittings are operable, on installation, to engage corresponding mating fittings of another co-operating half-frame. The first half-frame has a first direction of formation normal to the half-frame. At least a first of the plurality of molded securement fittings of the first half-frame has at least a second direction of formation. The second direction of formation is skewed relative to the first direction of formation. The second direction of formation is at least predominantly transverse to the first direction of formation.

In a feature of that aspect, at least a second of the array of molded securement fittings of the first half-frame has at least a third direction of formation that is different from the first direction of formation and different from the second direction of formation. In another feature, the second direction of formation is square to the first direction of formation. In still another feature, the second direction is square to the first direction of formation, and the third direction of formation is square to the first direction of formation and the third direction of formation is square to the second direction of formation.

In a further feature, at least a first of the molded securement fittings is a first male fitting and at least a second of the molded securement fittings is a first female fitting. The first male fitting and the first female fitting having corresponding mating profiles. In another feature, the array of molded securement fittings includes an equal number of male securement fittings and female securement fittings. In yet another feature, the window frame member includes an array of stops positioned to limit engagement range of the window frame member when the window frame member is mated to another such window frame member.

In another feature, the array of molded securement fittings has an axis of symmetry and when the window frame member is reversed about the axis of symmetry it is matable with another the window frame member that is the same as itself. In still another feature, the axis of symmetry is the first direction of formation, and symmetrical translation is by flipping the window frame front-for-back, and rotating the window frame 180 degrees about the axis of symmetry. In yet another feature, the fittings of the array of securement fittings are barbed to permit engagement in an insert direction and to oppose disengagement in an opposite direction. In a further feature, the securement fittings have serrated profiles that define an array of barbs. In still another feature, the array of securement fittings includes male securement fittings. The male securement fittings are four-sided in cross-section and hollow. In another feature, the array of securement fittings includes a female securement fitting that has first and second opposed engagement arrays spaced to receive a corresponding male securement fitting.

In another feature, the window frame includes a fascia and a peripheral wall standing way from the fascia; at least one of the molded securement fittings abuts the peripheral wall, and the one piece molding has a parting line where at least one fitting abuts the peripheral wall. In still another feature, the window frame member includes a fascia, a peripheral wall extending rearwardly of the fascia, and a rearwardly depending land connected to an inboard margin of the fascia. The rearwardly depending land is spaced from the peripheral wall. In yet another feature at least a first female securement fitting abuts the peripheral wall. The first female securement fitting has first and second spaced-apart legs that stand rearwardly of the fascia and that co-operate with the peripheral wall to form a C-shaped channel section therewith. In another feature the window frame member includes at least a first plate that co-operates with the first and second legs of the first female securement fitting to form a C-shaped section. The plate is rooted to the peripheral wall. The plate extends lengthwise beyond the legs of the first female securement fitting. The plate has a distal tip defining an engagement range of travel limit abutment. In yet another feature, the window frame member has a fascia, and the fascia presents a continuous external surface that is free of mounting fitting fastener penetrations. In still another feature, there is a pair of first and second window frame members wherein the first and second window frame members are window half-frames that mate together to form a window frame assembly with glazing capture therebetween, the half-frames having mating serrated barb arrays, and being free of threaded mechanical fasteners.

In another aspect of the invention, there is a window frame member. It has, or is, a unitary molded half-frame having first, second, third and fourth portions. The first and second portions define spaced-apart top and bottom transverse members of the half-frame. The third and fourth portions define spaced apart left hand and right hand upright members of the half-frame. The first, second, third and fourth portions co-operate to form a four-sided surround of an opening in which to mount glazing. The half-frame has a forwardly facing fascia. A first rearwardly extending wall terminates in a flange spaced rearwardly from the fascia. The flange defines a rearwardly facing land operable to engage the glazing. Each half-frame has a peripheral second wall located laterally outboard of the first rearwardly extending wall. It is spaced therefrom. The second wall extends rearwardly from the fascia and defines a stem wall relative thereto. An array of securement fittings is rooted to the fascia, with the securement fittings being spaced about the stem wall. The array of securement fittings includes a set of male securement fittings and a set of female securement fittings. The male securement fittings and the female securement fittings are equal in number and have corresponding mating serrated one-direction engagement serrated profiles. The female securement fittings each include a pair of legs abutting the stem wall and co-operating therewith to form a C-shaped section. There is a parting line where an inboard edge of the legs of the female securement fittings meet the stem wall. The male securement fittings abut, and merge into, the stem wall. There is a parting line where the male securement fittings meet the stem wall. There is an array of plates mounted to the stem wall. The plates co-operate with legs of one of the female securement fittings to form channel sections. The plates defining insert range of travel limit stops. The half-frame has a first direction of formation normal to the opening of the surround. The half-frame has at least a second direction of formation on which respective ones of the securement fitting are formed on the first portion of the half-frame, and a third direction of formation on which respective others of the securement fittings are formed on the third portion of the half-frame. The fascia of the half-frame being free of mechanical fastener penetrations.

In a feature of that aspect, the second direction of formation is square to the first direction of formation. The third direction of formation is square to the first direction of formation and to the second direction of formation. Each of the first, second, third and fourth portions of the half-frame has at least one female securement fitting and at least one male securement fitting. The half-frame is reversible to mate with another half-frame that is the same to form a window frame assembly with glazing captured between the two half-frames.

In another aspect of the invention there is any combination of any of the features of any one of embodiments shown or described herein, in combination with the features of any other embodiment, except to the extent those features are mutually exclusive. In another aspect of the invention, there is any apparatus substantially as shown or described herein, in whole or in part.

BRIEF DESCRIPTION OF THE DRAWINGS

These aspects and other features of the invention can be understood with the aid of the following illustrations of a number of exemplary, and non-limiting, embodiments of the principles of the invention in which.

DETAILED DESCRIPTION

Figure 1:
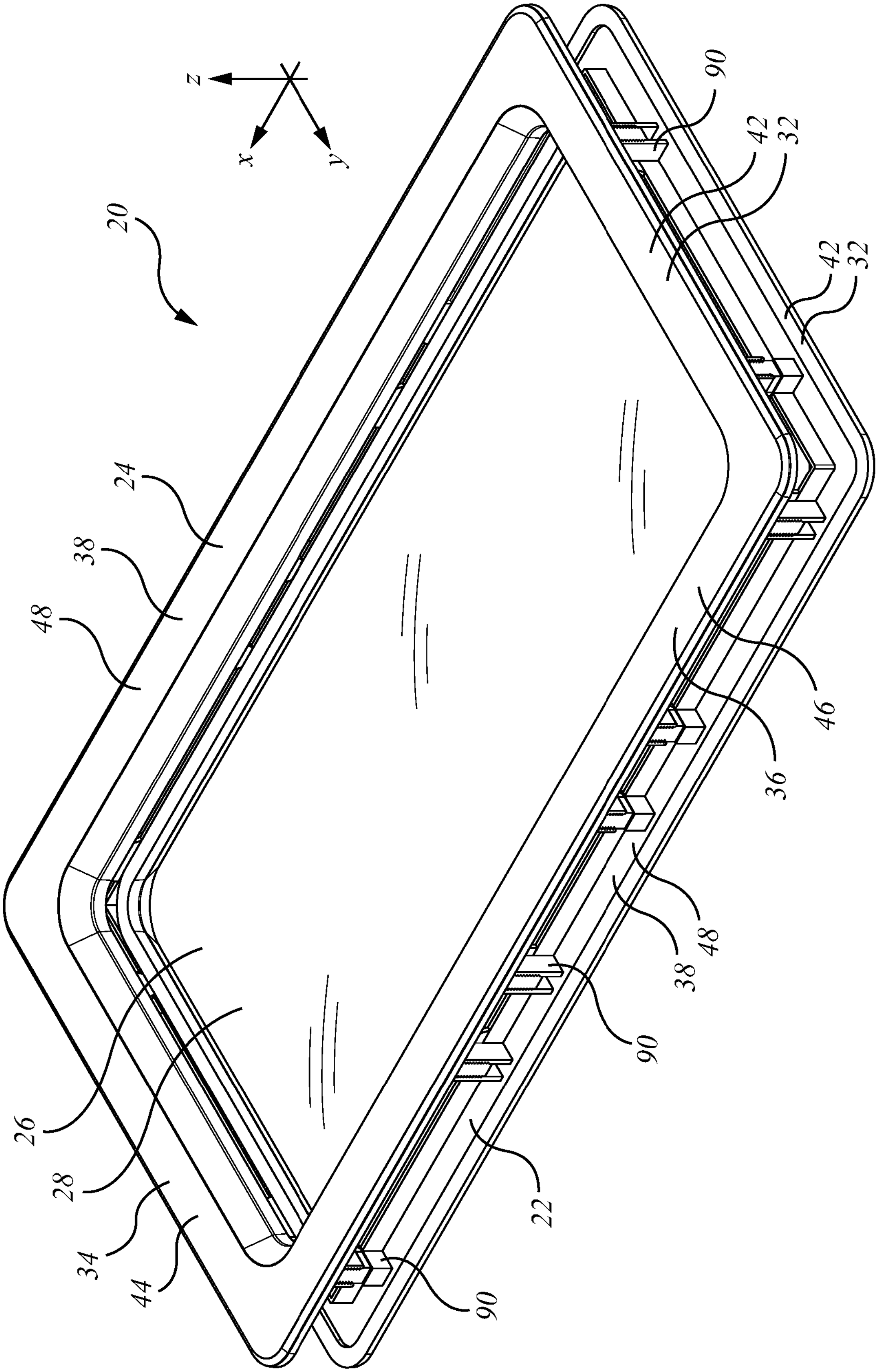
FIG. 1 shows a perspective general assembly view of a window frame assembly.
Figure 2:
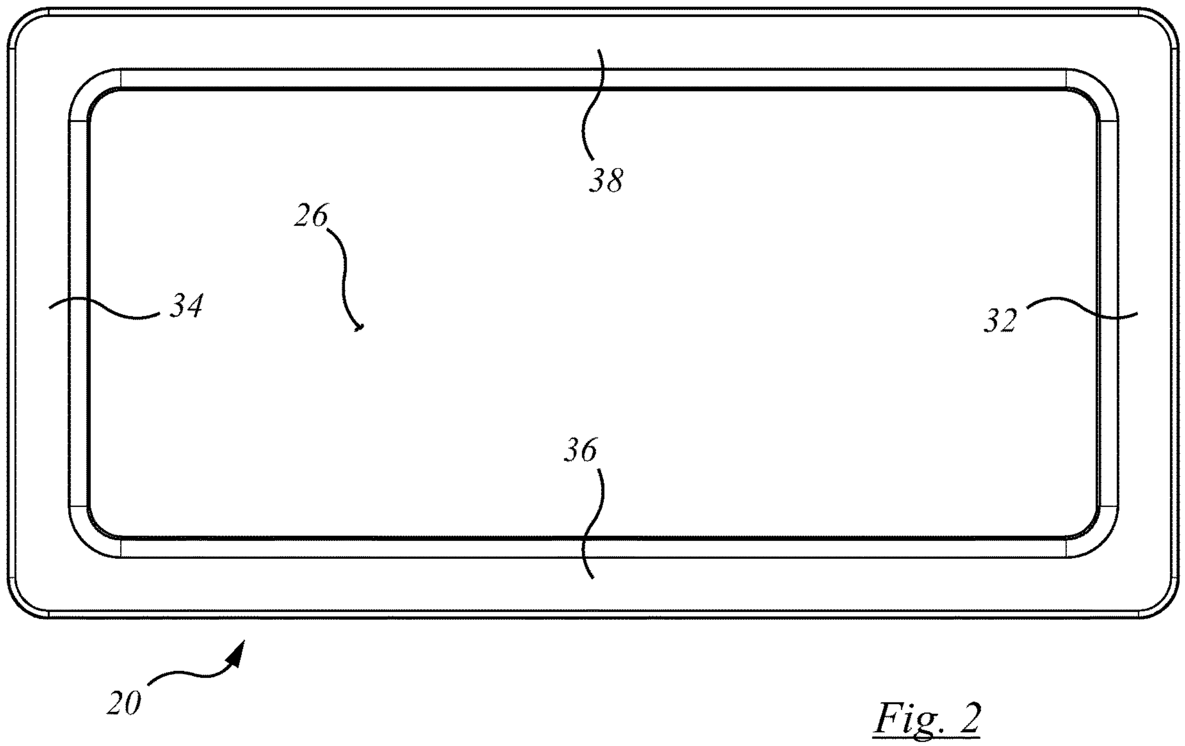
FIG. 2 shows a front view of the window frame assembly of FIG. 1, which is the same as the rear view of the window frame assembly of FIG. 1.

The description that follows, and the embodiments described therein, are provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The drawings may be understood to be to scale and in proportion unless otherwise noted. The wording used herein is intended to include both singular and plural where such would be understood, and to include synonyms or analogous terminology to the terminology used, and to include equivalents thereof in English or in any language into which this specification may be translated, without being limited to specific words or phrases.

For the purposes of this description, it may be that a Cartesian frame of reference may be employed. In such a frame of reference, the long, or largest, dimension of an object may be considered to extend in the direction of the x-axis, the base of the article, where substantially planar, may be considered to extend in an x-y plane, and the height of the article may be measured in the vertical, or y-direction. Accordingly, the width of the window assembly described herein may be arbitrarily designated as the x-direction; and the height may be arbitrarily designated as the y-direction. The through-thickness is then the z-direction. Unless noted otherwise, the terms "inside" and "outside", "inwardly" and "outwardly", refer to location or orientation relative to the window. In this specification, The commonly used engineering terms "proud", "flush" and "shy" may be used to denote items that, respectively, protrude beyond an adjacent element, are level with an adjacent element, or do not extend as far as an adjacent element, the terms corresponding conceptually to the conditions of "greater than", "equal to" and "less than".

Referring to the Figures, and by way of a general overview, a window assembly is indicated generally as 20. Window assembly 20 may be used as a window in a wall 18, or it may be used as a window in a door, as may be. Window assembly 20 may include a first, or inside, surround, or bezel, or frame, or half-frame 22; a second, or outside, surround, or bezel, or frame, or half-frame 24; and a panel assembly 26 carried by, and typically bracketed by, or sandwiched by, the inside and outside assemblies 22, 24. When the sandwich is formed, the inside frame 22 and the outside frame 24 may be held in place with one or more securement fittings 30.

In the most generic sense, panel assembly 26 may be any kind of panel. However, in the context of the present invention, panel assembly 26 may typically have the form of a planar, or substantially planar sheet, and may most typically be glazing such as may be identified generically as a window pane 28, whether clear (i.e., transparent) or frosted (translucent); whether single pane or multi-pane; whether sealed or unsealed; whether plain or patterned or colored or decorative in the form of a stained glass assembly or similar.

Figure 3:
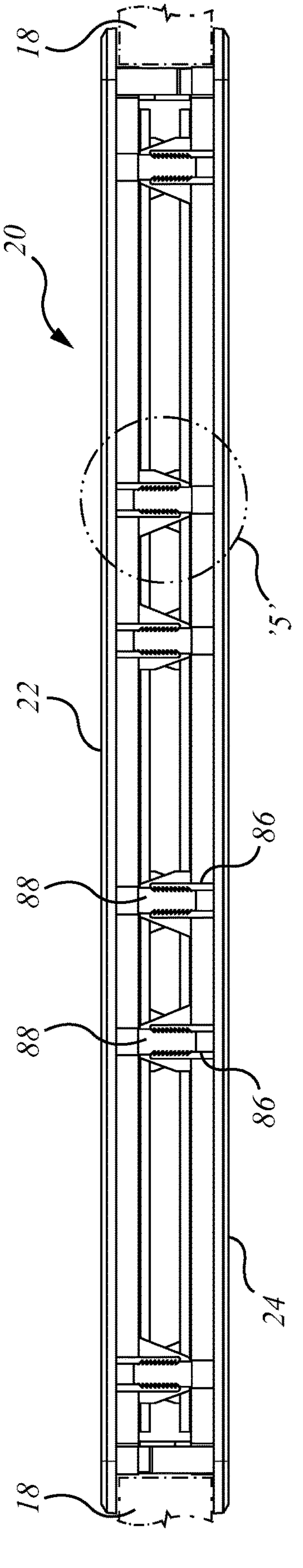
FIG. 3 is a side view on a front long side section of the window frame assembly of FIG. 1, the rear side long view being the same.
Figure 5:
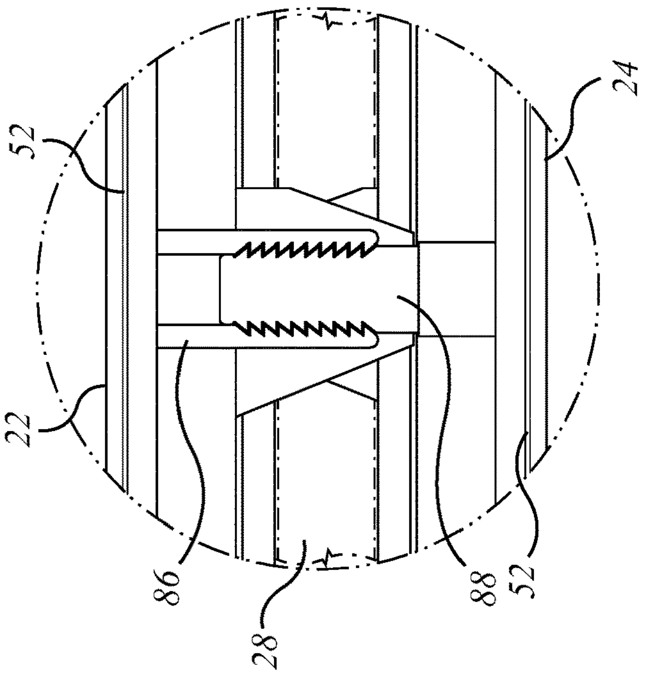
FIG. 5 is an enlarged view of detail '5' of FIG. 3 showing mating securement fittings of the assembly of FIG. 3.
Figure 4:
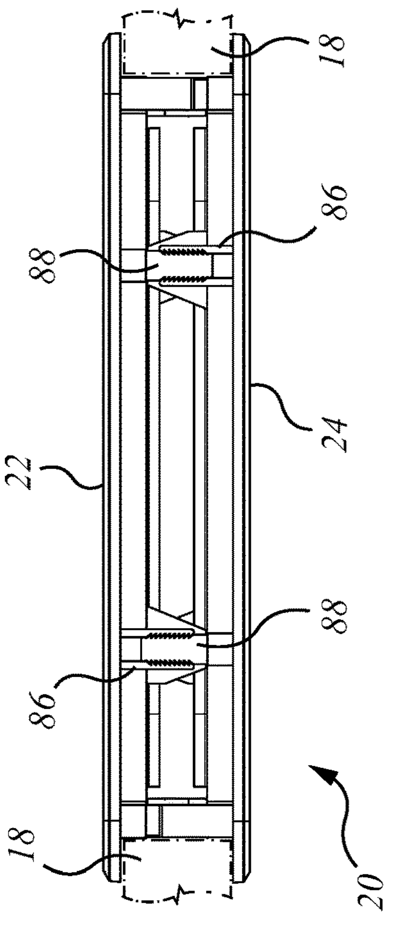
FIG. 4 is a left side view of the window frame assembly of FIG. 1, the right side view being the same.
Figure 6:
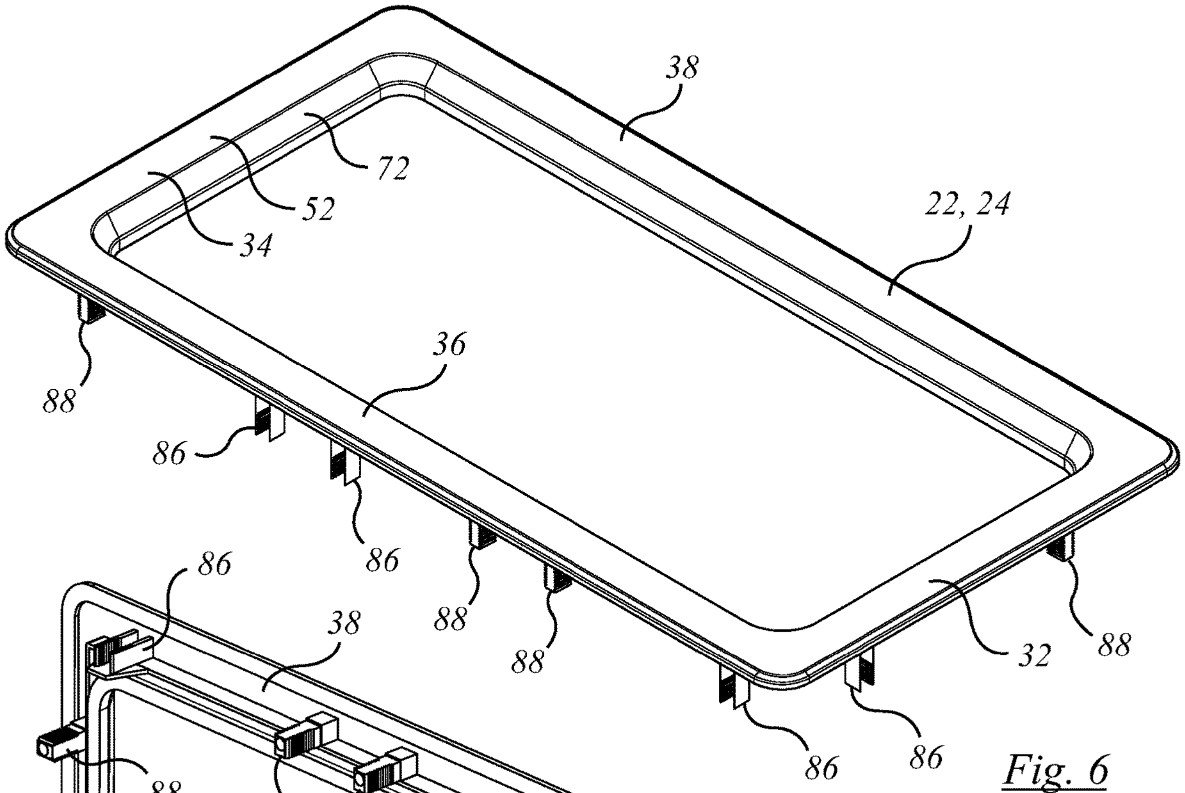
FIG. 6 is an isometric view of the window frame top half of the window frame assembly of FIG. 1, the bottom half being the same as the top half.
Figure 7:
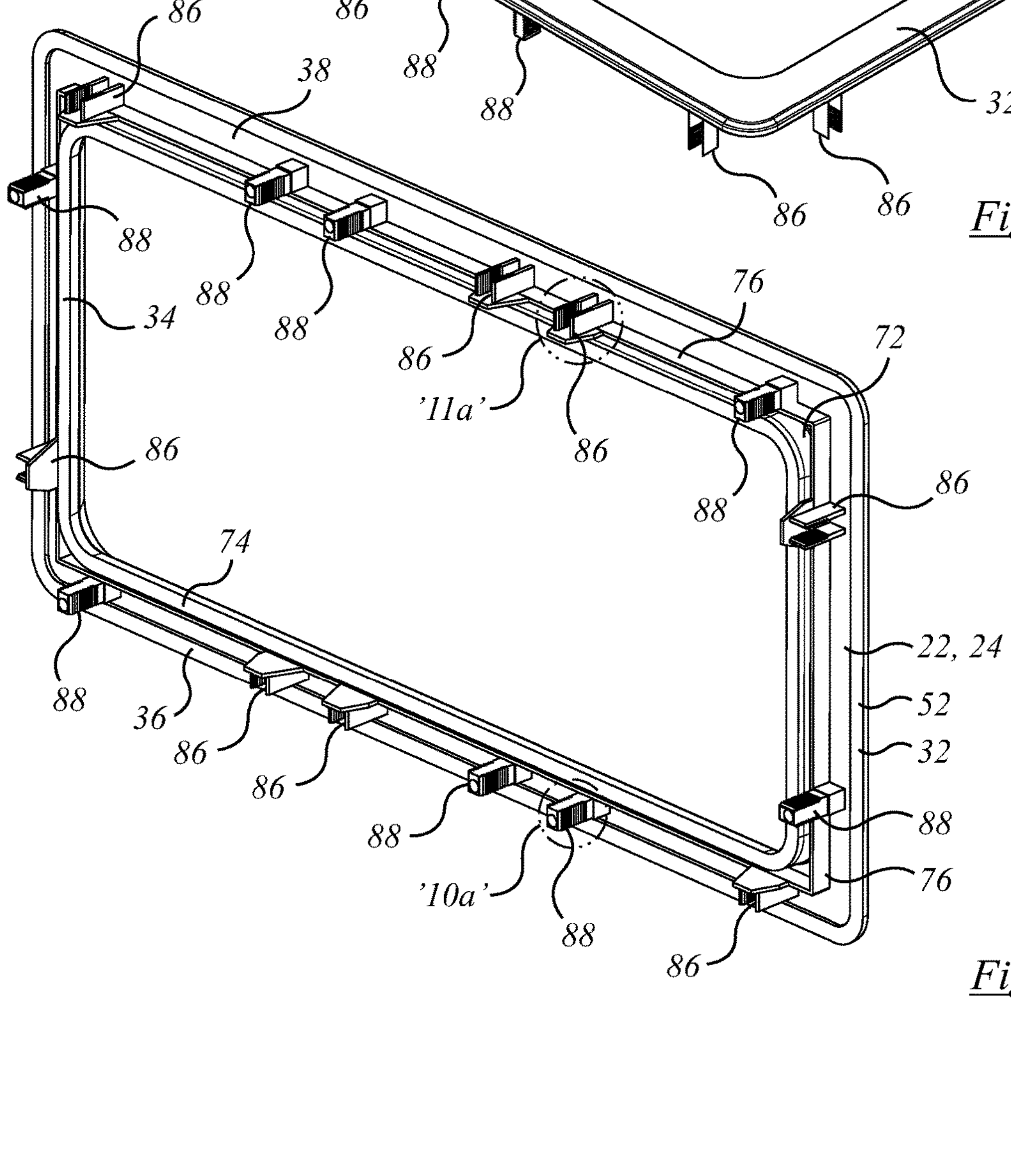
FIG. 7 is an opposite isometric view to that of FIG. 5 showing the inside thereof.

While round, or oval, or triangular or trapezoidal planform window shapes are known, for the purposes of this description, and in most common use, window assembly 20 and panel assembly 26 in particular may be taken as being four-sided, most typically rectangular panel elements. Often, though not always, the rectangular form may have a long dimension that is the vertical dimension on installation, corresponding to the x-axis or x-direction in this description. Window assembly 20 and panel assembly 26 may also have a shorter dimension that may be the width dimension on installation running in the y-axis or y-direction. The entire assembly may have a through thickness in the z-direction. The entire window assembly may be predominantly or substantially planar in the sense that the x-direction and y-direction extent of the structure may typically be many times the through-thickness dimension in the z-direction. The entire assembly may be mounted in surrounding structure, suggested by the intermittent dashed lines of wall 18 in FIGS. 3 and 4, such as in a wall (or door).

For the purposes of the present description, panel assembly 26 will be considered to be transparent glazing that includes a first sheet of glazing, a second pane of glazing, and a third member which may have the form or function of a spacer or standoff, such as may be located between first pane and second pane. The panes, and the third member may be sealed about their common periphery to form a sealed multi-pane window panel. Although a double pane is shown, the window may also be a triple pane window. The window panel may also be provided with coatings to reduce glare or heat transfer, as may be.

It is to some extent arbitrary which of half-frame 22 and half-frame 24 is the inside frame or outside frame, or, alternatively, the first frame or second frame, however they may be named. As a question of terminology, item 22 or 24 may be referred to individually as a "frame", or they may be referred to as a "half-frame" in the sense of being either the inside or the outside half of the overall window frame assembly 20 more generally. The respective outwardly facing surfaces of frames, or half-frames 22 and 24 need not be the same in external profile or appearance. However, for the purpose of this description it is convenient that they be the same. To the extent that in some embodiments they are the same, half-frames 22 and 24 are interchangeable.

Second, or inside, half-frame 24 may be identical to first, or outside, half-frame 22, although this need not necessarily be so in the general case. For the purposes of simplification of this description, in the embodiment shown it will be taken that this is so. As such, a description of the cross-section of bottom portion of first frame 22 may be taken as representative of all of the members of first frame 22 and second frame 24.

Figure 9A:
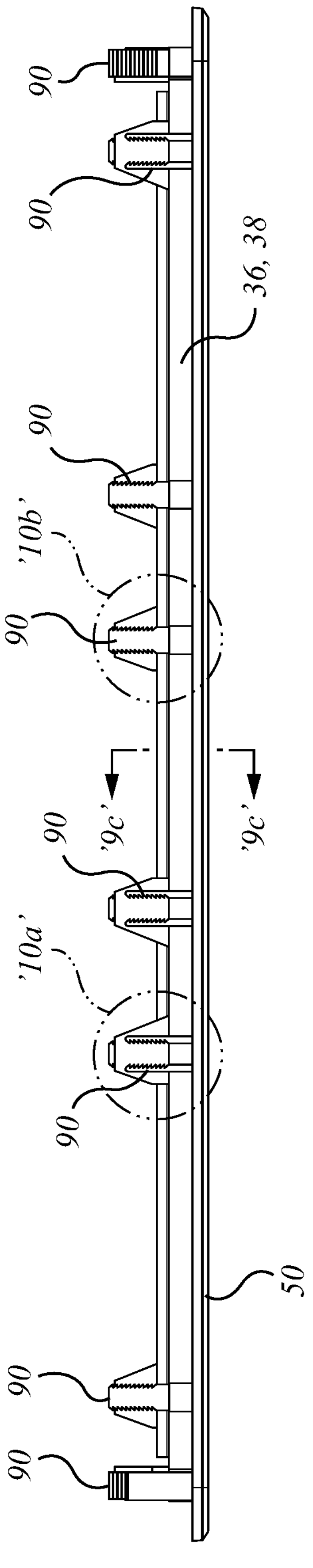
FIG. 9*a* is a side view on a front long side section of the window frame assembly top half of FIG. 5, the rear side long view being the same.
Figure 9C:
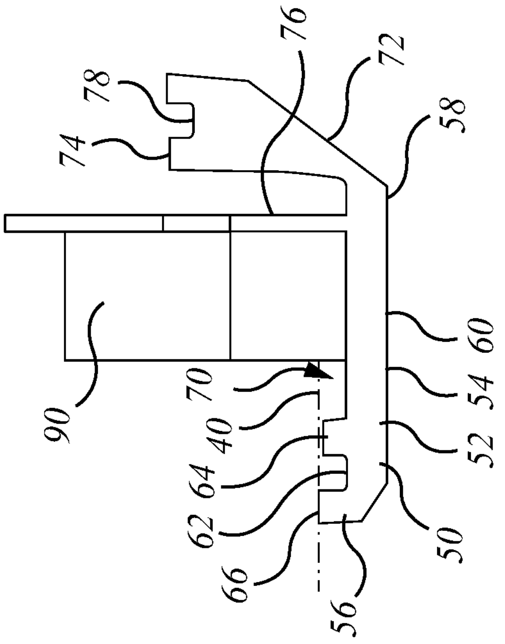
FIG. 9*c* is a section of the window frame top half on section '9*c*-9*c*' of FIG. 9*a;*
Figure 9B:
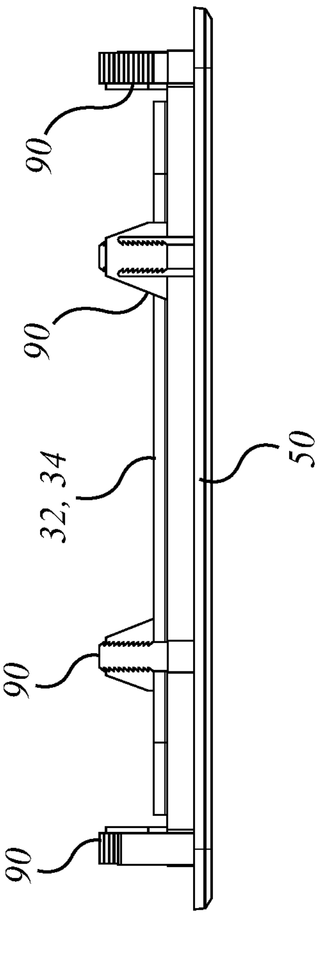
FIG. 9*b* is a left side view of the window frame top half of FIG. 5, the right side view being the same.

To the extent that they are taken as being the same, each of half-frames 22 and 24 has a first portion 32, a second portion 34, a third portion 36 and a fourth portion 38, co-operating to form a rectangle with an open center. The molding is accordingly "a surround", i.e., an open frame that surrounds a glazing panel. The first portion 32 may be a first cross-member such as bottom sill member 42. The second portion 34 may be a second cross-member in the form of an upper cross-member or sash 44. The third portion 36 may be a first side member, or first upright, or first jamb 46 extending between members 42 and 44. The fourth portion 38 may be termed a second side member, or second upright, or second jamb 48, that is spaced apart from and opposed to first jamb 46. The elements of the assembly, namely portions 42, 44, 46 and 48, may all have the same cross-sectional profile as illustrated in FIG. 9*c*. To that extent, in the embodiment illustrated they are reversible left-for-right and top-for-bottom.

Each of half-frames 22, 24 is formed as a single piece molding. Although the molding could be made of aluminum, it is typically made of plastic, which may be PVC. FIG. 9*c* shows the cross-section of bottom portion 42, which is representative of each side. The molding is identified generally as 50. It has a first portion, or first item, or first wall, or member 52 that can be thought of as the external facing or fascia of molding 50. That is, the exterior surface 54 of member 52 faces away from the window pane, and provides the presentation surface most visible to persons facing the window, and, as such is "the fascia". It can be considered, and is, a "trim panel" which may have or define an arbitrary decorative appearance, or to which an arbitrary decorative appearance may be applied. Member 52 has a first end, 56, a second end 58, and a medial portion 60. Note that the four portions of the fascia, like the four portions of half-frames 22, 24 generally, lie substantially in a plane (e.g., an x-y plane) and the primary direction of closing of the dies used to make this half-frames is normal thereto (e.g., in the z-direction).

First end 56 is the outermost, or outboard, or distal end seen in FIG. 9*c*. In use it is the end most distant from the window pane. It has the profile of a rearwardly formed finger 64, or cove molding that, as installed, typically abuts the internal wall surface. It is the end that laps over the adjacent wall or door structure, shown in an intermittent line and indicated notionally as 40. That is, at the first end 56 member 52 may terminate in a foot that may have the form of a doubling, or flange, or bulbous end, or thickened end, or finger 64, as may be, that is fattened to provide an index, or datum, or stop, or abutment, surface 66 that may bear against, e.g., a wood panel, or drywall, of a door face, of the surrounding structure. It also has a relief or groove 62 that defines an O-ring seat, or a sealant groove that may be filled with either an O-ring or sealant, such as a curable sealant. On the inward (or wall-facing, or back) face of member 52 there may be a space, or alcove, or chamber, or rebate, or relief, or seat, or accommodation 70, however it may be termed, that accommodation having a depth equal to or greater than the distance by which thickened end 64 stands inwardly proud of the inward surface.

Second end 58 is the inner edge of first member 52 most proximate to window pane or glazing 28. It meets the second portion, or transition, 72 of molding 50. Transition 72 may include an arm or leg, or finger, or flange, or body, or lobe, as a member having a face extending diagonally inwardly, or rearwardly, from member 52 toward the plane of the window pane, and that forms the visible or cosmetic convergent profile of the window frame. Second portion or second member 72 may also terminate at its inner end in a junction with a third member, or third flange or third portion 74 that is thickened, and that forms a surface 78 facing in planar opposition to the glazing member. Surface 78 may itself define a land that, as installed abuts the glazing. Alternatively a seal or gasket may locate or seat on the land defined by surface 78, and, on installation, the seal or gasket is captured between surface 78 and the glazing, and is compressed to for a sealed contact. Alternatively, third portion 74 may have another O-ring seal seat or groove 62, into which either a gasket or seal, such as an O-ring, or a bead of curable sealant is located, outboard of surface 78. The further outboard part of third portion 74 may be recessed so that excess sealant may escape toward stem 76. Second member 72 and face 74 co-operate to define a peripherally extending wall, or seat, or setting, or bezel that extends around, and captures the edges of, glazing 28. Molding 50 has a fourth portion, or member, or web, or stem 76. It extends around the periphery of molding 50. Stem 76 forms a rectangular peripheral wall. It has respective first, second, third and fourth portions corresponding to first, second, third, and fourth portions 32, 34, 36 and 38 of half-frames 22, 24. The root of stem 76 meets the others members at the junction of the first and second portions. As can be seen in the section of FIG. 9*c*, the cavity formed between stem 76 and third portion 74 broadens toward its opening, and so permits extraction of the forming die in the z-direction.

The structure described so far may be considered conceptually as a beam in which the main web is member 52, member 72 (and finger 64) define a re-entrant top flange, and third face 74 forms a bottom flange, or quasi-flange, with predominant resistance to bending in the plane parallel to the main surface of panel assembly 26. It also describes a beam with non-trivial depth in the through-thickness direction of panel 26.

An array of securement fittings, or connector engagement member, or structures, or sockets, or prongs, or connection fittings, identified as 30 may have the form of a connector 90 extending inwardly from the stem defined by member 76 and away from member 52. Molding 50 has a set, or array, of such connectors 90 spaced around the periphery of stem 76. The set of connectors 90 may include a male connector portion or connector half, or simply "a male connector"; or a female connector portion, or connector half, or simply "a female connector". In the terminology herein the term "connector" may refer to the assembly of a mating male and female pair, or it may refer to either the male portion or the female portion individually. The female connector may be identified as item 86. The male connector is identified as 88.

Female connector 86 is rooted in outer facing member 52. Female connector 86 may include, and as shown does include, a pair of legs 92 and 94 that are spaced apart and that extend away from closed section member 76. Legs 92 and 94 may be symmetrical. That is to say, they may be mirror images of each other such that, together, they form a co-operating pair, and, collectively, form female connector 86.

Each of the legs 92 and 94, or both legs taken together, may be referred to as a prong or prongs. The two legs may define between them an accommodation 84. The inside faces of legs 92, 94, that is, the sides of legs 92, 94 that are opposed and therefore facing generally toward each other to define the sides of accommodation 84, may be provided with an internal profile that may include ridges, or threads, or asperities, or teeth 96. The end face, or tip, of each prong may be rounded or chamfered, such as to provide a lead-in for an approaching engaging member of male connector 88.

In the embodiment shown, the profiles on the inside faces, which define the mating engagement interfaces of female connector 86 include at least one feature defining a barb or a catch 100. In the lee of the catch, a relief 102 for accommodating a mating catch 100 of another member that may engage catch 100. Legs 92 and 94 are rooted in the intermediate closed-periphery member 52, and stand upwardly away therefrom. In the embodiment shown, there may be an array of several such barbs or catches 100 and reliefs 102, such as may combine so that catch 100, as a collective feature, has the form of a serrated rack, as shown. When a mating connector is advanced, it can run up the inlet sloped sides of the barbs, effectively as cams. In the reverse direction, however, the rearward facing slopes of the ridges or teeth are such that when engagement is made and a rearward force is applied, the teeth tend to be unable to escape from each other. In the case of the embodiment shown, the flat faces of reliefs 102 that impede retraction are formed in a plane (e.g., an x-y plane) square to the direction of insertion (e.g., the z-direction), which is also square to (i.e., perpendicular to) the long axis, and axis of symmetry, or each of connectors 86 and 88.

Figure 10A:
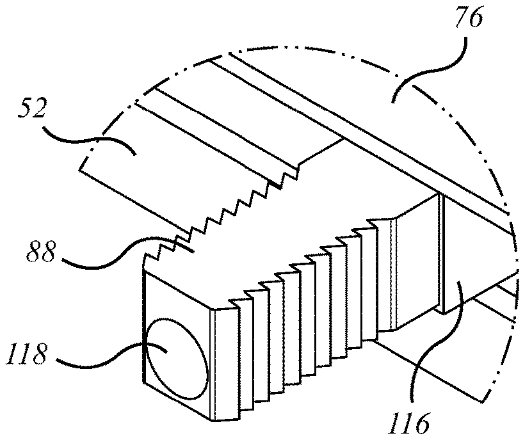
FIG. 10*a* is an enlargement of isometric detail '10*a*' showing a male securement fitting of the window top half-frame of FIG. 7.
Figure 10B:
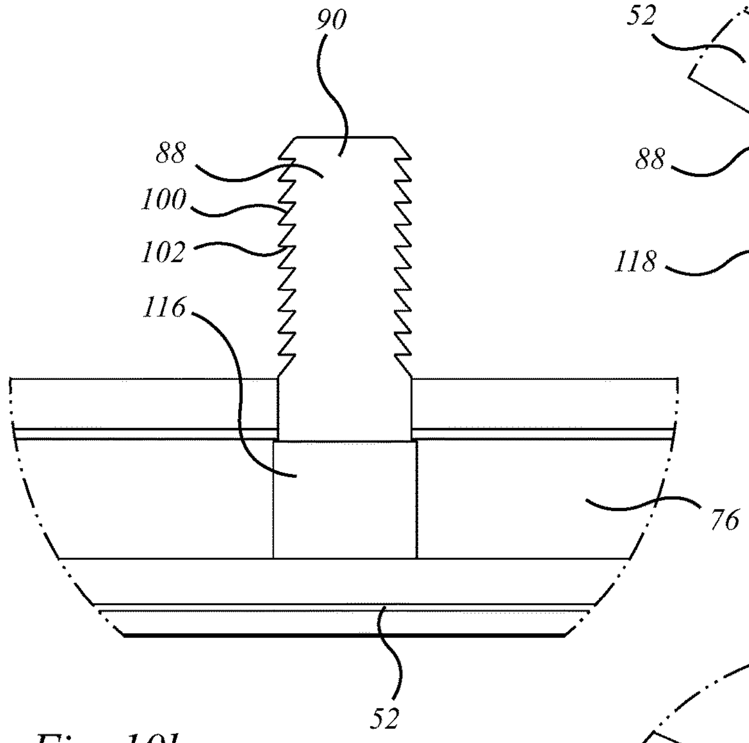
FIG. 10*b* is an enlargement of isometric detail '10*b*' of a male securement fitting of the window top half-frame of FIG. 7.
Figure 10C:
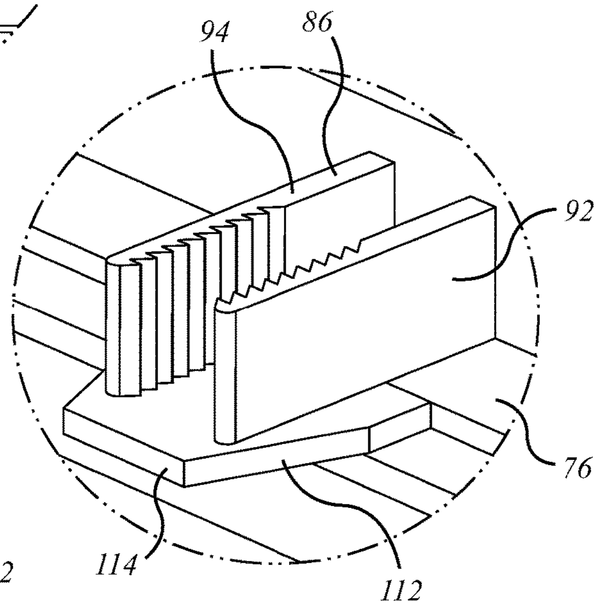
FIG. 10*c* is an enlargement of isometric detail '10*c*' showing a female securement fitting of the window top half-frame of FIG. 7.
Figure 10D:
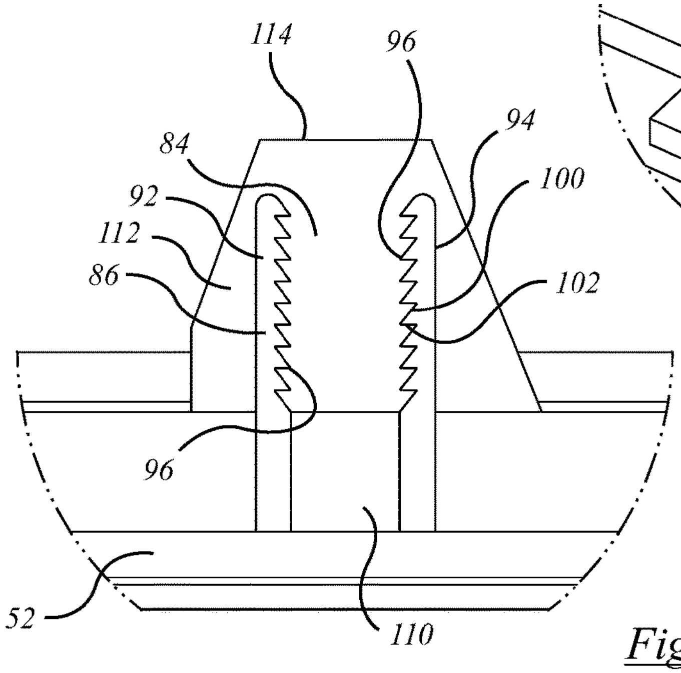
FIG. 10*d* is an enlargement of isometric detail '10*d*' of a female securement fitting of the window top half-frame of FIG. 7.

In the embodiment shown, female connector 86 has the form of a channel section, in which a back 110 extends as a web across the laterally inner end edges of legs 92, 94, thus forming a C-section. The lower, or inner, or proximal, portion of back 110 is defined by the peripheral wall formed by stem 76. The distal portion of back 110 is defined by a web or plate 112 that is rooted to, and that extends upwardly from first member 52 and outwardly and away from the outer or upward margin of stem 76. Inasmuch as female connector 86 is formed using a laterally movable die, or die insert, there is a parting line, where the legs of female connector 86 meet stem 76. As seen in the example of FIGS. 10*c* and 10*d*, web or plate 112 is broader at its base or root, where it mates with, and merges into, stem 76; and narrower at its tip, distant from stem 76. As may also be noted, although plate 112 tapers toward its tip, it extends widthwise beyond legs 92, 94 at all heights. End plate 112 terminates in a tip 114 that has a flat abutment surface. In use, when window frame halves 22, 24 are brought together, tip 114 will bottom on the exposed margin of stem 76 of the opposed window frame half if lands 76 have not already done so by bottoming on the glazing. To that extent, the engagement of tip 114 with opposite stem 76 provides an end-of-travel limit to the range of travel of connectors 90, thereby preventing over-travel engagement that might otherwise tend to cause damage.

Male connector 88 forms the mating negative image of female connector 86. That is, Male connector 88 has the form of a prong that has a shank rooted in member 52, and that extends outwardly and away therefrom adjacent to stem 76. The shank or root of male connector 88 has the form of a pedestal 116, with a pedestal shoulder shy of the height of the outward margin of stem 76. The distal portion of male connector 88 has an external profile. The external profile co-operates with the internal profile of legs 92, 94 of female connector 86. In the example shown, it has a corresponding set of catches 100 and relief 102. Thus male connector 88 has two sides with the serrated or saw-toothed rack face. Those sides are mutually opposed and face away from each other. The other two sides are flat, such that, on installation, the near face slides flat against the respective opposed plate 112, and the other, opposed, flat face lies substantially flush with the opposite margins of legs 92, 94. The center of male connector 88 may have, and in the example illustrated does have, a central bore 118 that is blind.

It could be that all of male connectors 88 are on one frame half; and all of female connectors 86 are on the other half. Alternatively, however, the male and female connectors can be mounted on half-frames 22, 24 in a manner such that the frames are the same, yet when one frame is reversed the two frames mate together. For the purpose of this description, such a property will be referred to as "self-mating". It can also be thought of as a form of symmetry in which the axis of symmetry is the z-axis, and the symmetrical translation is 180 degree rotation about the z-axis. In the embodiment shown, male connectors 88 and female connectors 86 alternate on each of portions 42, 44, 46 and 48, but do so in a manner that when one part is turned over, it mates on the other.

As noted, members 22 and 24 are unitary molded parts. In this discussion the long side of the frame defines the x-direction or x-axis; the transverse or short side of the frame defines the y-direction, and the through-thickness of the frame defines the z-direction, or z-axis. For the unitary moldings of members 22 and 24 the closing direction of the mold is the z-direction, i.e., the direction perpendicular to the long and short sides 42, 44, 46 and 48. This may be referred to as a "direction of formation", and, in this instance the motion in the z-direction is motion in the first, or primary, direction of formation.

However, the formations of facial profiles on female and male connectors 86, 88 are skewed relative to the z-axis. That is, the mold includes a separate member that reciprocates on a different, non-parallel axis of motion. That direction may be referred to as a secondary direction of motion, or second direction of formation. In the embodiment shown the profiles of connector 86, 88 are formed by using a transversely movable die member, the transversely movable die member having an axis of motion that is skewed relative to the z-axis. That direction of motion, and hence the defining wall axis direction, may be, and as shown is, predominantly transverse, i.e., meaning less than 45 degrees from perpendicular. In the example shown, the direction of the transverse die, being the secondary direction of motion, or second direction of formation, is square to the direction of the primary die in molding.

Similarly, while the connectors 86, 88 on the long side 46, 48 have profiles determined by dies that move in the secondary direction of motion, which, in this example is the y-direction, connectors 86, 88 of the short sides 42, 44 are also formed by motion of a transversely moving die, in this case a die moving in a third direction of motion, or third direction of formation, that third direction also being transverse to the primary direction of motion in the die. In the particular example the motion of the third die is also predominantly transverse, and in this example is square, i.e., perpendicular, to the primary direction. That is, the third direction of motion, defining the direction of the profile is in the x-direction relative to short sides 42, 44.

While three directions of formation have been defined, it is understood that the molding process for members 22, 24 involves laterally acting mold members for each of sides 42, 44, 46 and 48, such that there are actually five moving mold members, namely the main mold die that moves in the z-direction; two dies that move in the y-direction and −y-direction for forming the profiles on connectors 86 and 88 on long sides 46, 48 respectively; and two dies that move in the x-direction and −x direction on short sides 42, 44 respectively.

In the embodiment shown and described, the external surfaces of members 42, 44, 46 and 48 are free of fasteners and fastener sockets. This yields a clear, unblemished external surface, which may be suitable for painting. Moreover, the elimination of sockets or countersinks or penetrations on the forward, or outer, or exposed surface of the fascia of member 52 for the installation of threaded mechanical fasteners such as screws or bolts, may also tend to reduce, or to eliminate, the possibility of an installer driving a threaded fastener too far, and puncturing the far side surface; or driving it too far in the plastic of the molding, and destroying the plastic fitting itself, so that it will no longer hold.

Figure 8:
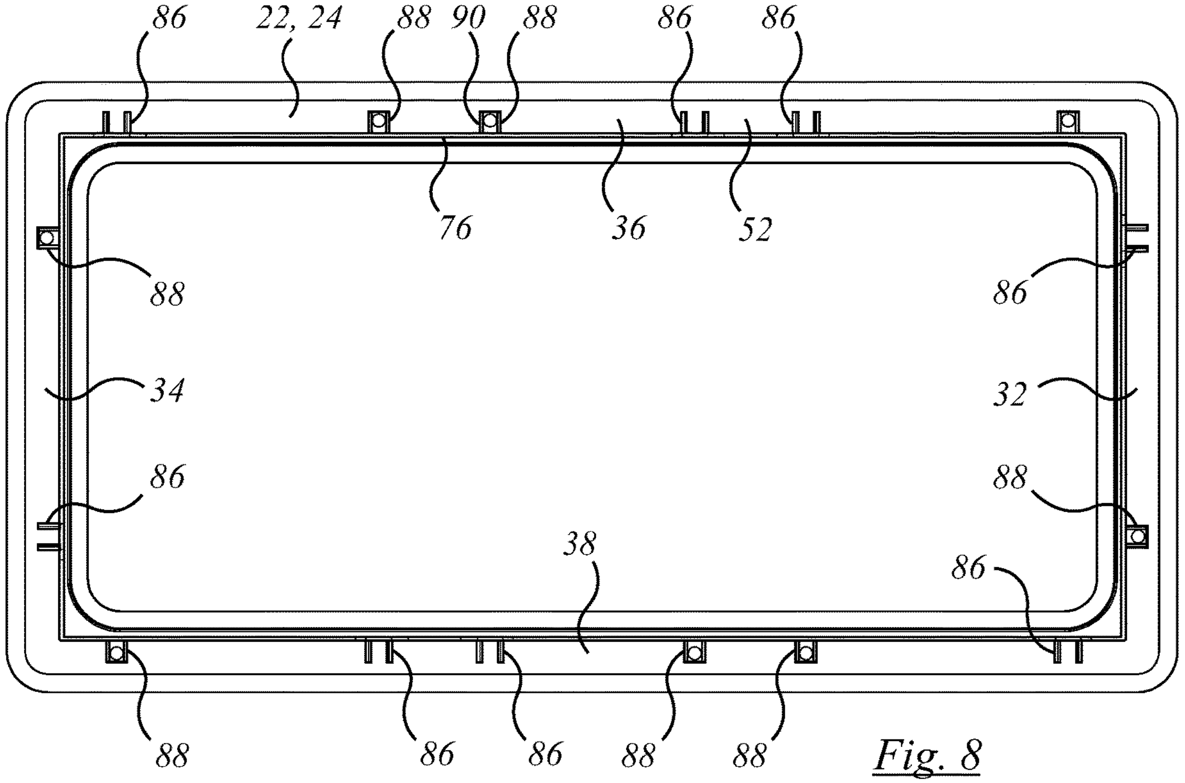
FIG. 8 is bottom, or inside, view of the window frame top half of FIG. 5.

It may also be noted that in customary threaded-fastener connections in molded window frame members, there is typically a male side that has an externally accessible socket or counter-sink, through which the point of a screw is admitted, and driven; and, on the other side of the frame, there is a tapered boss or pedestal into which the screw is driven. The tapered boss or pedestal is typically round in cross-section, and may have lateral stiffening webs or gussets to hold the pedestal upright, i.e., perpendicular to the window frame more generally. In contrast, the prong defined by fastener or connector 88, when viewed axially as in FIG. 8, is four-sided, being rectangular or square. The rectangular or square shape yields sides that, but for the imposed rack profile, would be planar. They are not planar due to the deviations from the plane of the ridges and reliefs. That deviation from planar is along a single degree of freedom of motion. That is, the surface is not a compound surface of curvature, but rather a surface defined by a profile that lies in a 2-D plane, viewed edge-on. This means that the resultant engagement occurs over a relatively wide engagement width, and, overall, a relatively large engagement area when the height of the serrated array is multiplied by its width.

Furthermore, while it is possible to apply an epoxy, adhesive, or other bonding agent to the serrated surfaces of connectors 86 or 88, or both, the nature of the assembly is such that once engaged, the mating elements are able to yield a securement without the use of glues or adhesives, or the time required for such glues or adhesives to cure. That is, the first frame member and the second frame member have mutually engaging connectors, or end fittings, those fittings being male on one hand, and female on the other. The second frame member and second end of the connector have mutually engaging end fittings, being male on one hand, and female on the other, and being one-way spring-biased snap-fit on assembly.

In the molding process, the lateral movable inserts having the profiles of securement fittings 30 defined therein are advanced transversely inward relative to the main female mold of the half-frame and positioned in place on the respective x and y sides. The male side of the main mold is then advanced in the z-direction to close the mold. The plastic is injected to fill the mold. After a time for curing, the male side of the main mold is opened and the lateral inserts are retracted along the respective lateral axes of formation of the securement fittings to free the connector fittings for extraction in the z-direction from the female half of the main mold.

Figure 11A:
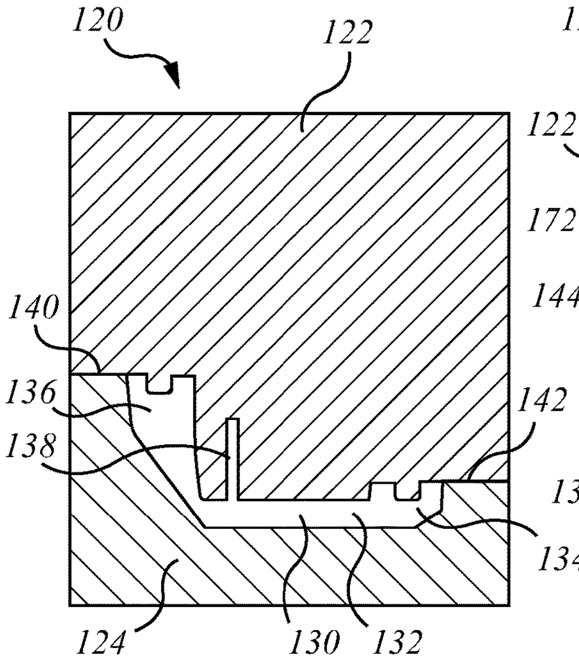
FIG. 11*a* is a view of molds used to produce the window frame half of FIG. 1, corresponding to the resultant molded section at IIa-IIa' of FIG. 8.

FIGS. 11*a*-11*c* and 12*a*-12*c* show the mold elements used to make the half-frames. The mold may be referred to in its totality as mold 120. It may include, and as illustrated does include, a first mold member, or main mold member, often referred to as the female mold 122. It may be referred to as the "stationary" mold. There is a second mold member 124 which may be referred to as the "moving" mold member, or the male mold member. Whether one or both of members 122 and 124 move, there is relative motion of the male mold member 124 relative to the female mold member. It is reciprocating motion in the z-direction to close to allow the feedstock to be injected, and to open to allow the resultant molded part to be released. As seen in FIG. 11*a*, when mold members 122 and 124 are closed, a cavity 130 remains, with first, second, third and fourth portions 132, 134, 136 and 138 of cavity 130 corresponding to first, second, third and fourth portions 52, 72, 74 and 76 of molding 50. As seen, first member 122 and second member 124 meet, and mate, at abutting surfaces, or lands, 140, 142 that are respectively inboard and outboard of cavity 130. These are the basic geometric features of mold 120.

Figure 11B:
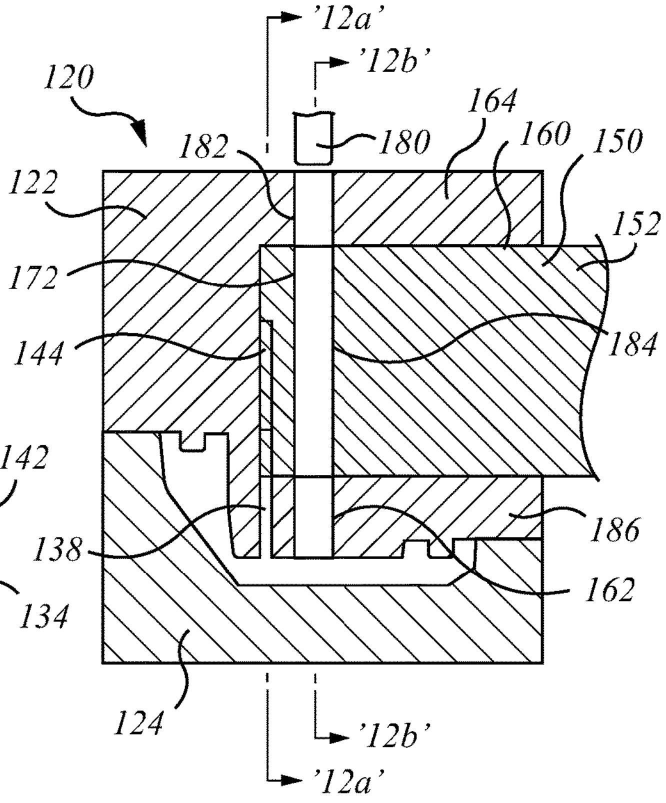
FIG. 11*b* is a cross-section of molds used to produce the window frame half yielding the resultant molded section at IIb-IIb'.
Figure 11C:
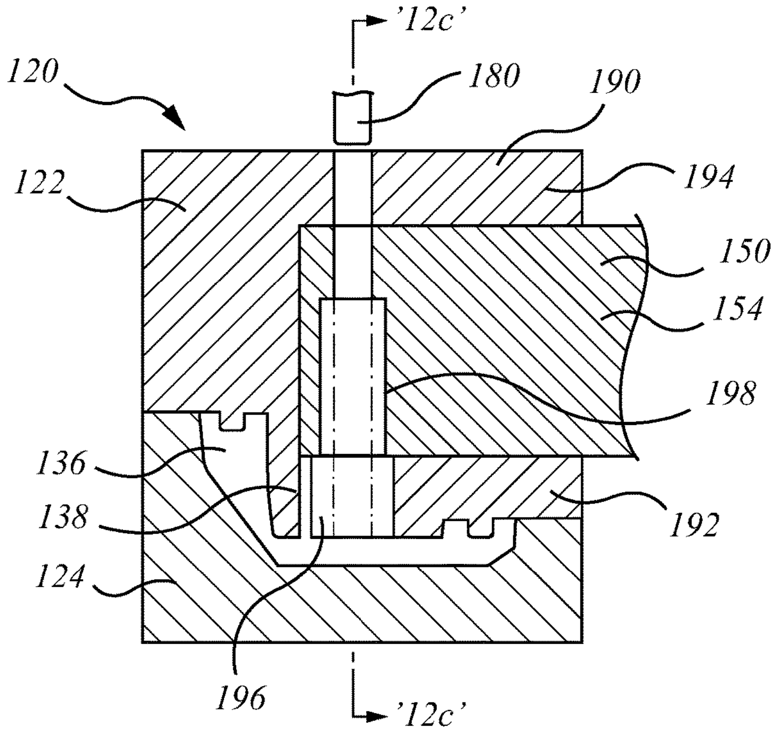
FIG. 11*c* is a cross-section of molds used to produce the window frame half, yielding the resultant molded section at '11*c*-11*c';*
Figure 12A:
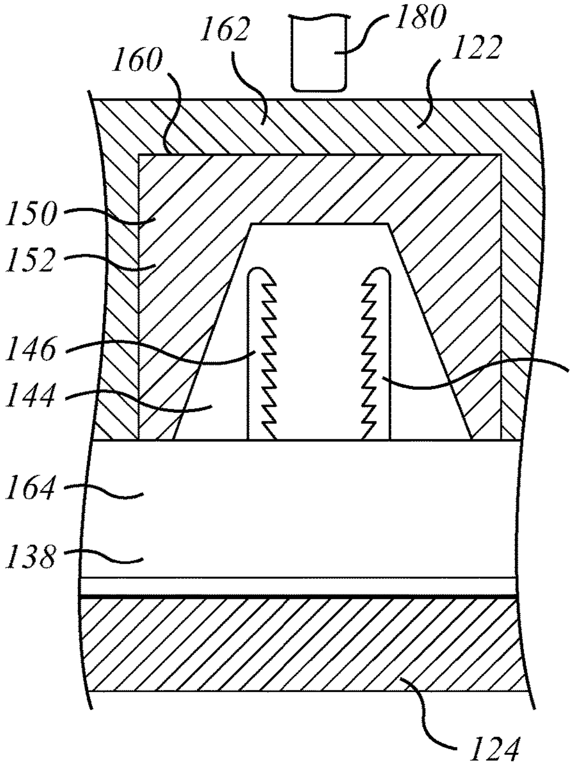
FIG. 12*a* is a view of the molds used to produce the window frame female connector detail of FIG. 11*b* at section '12*a*-12*a';*
Figure 12B:
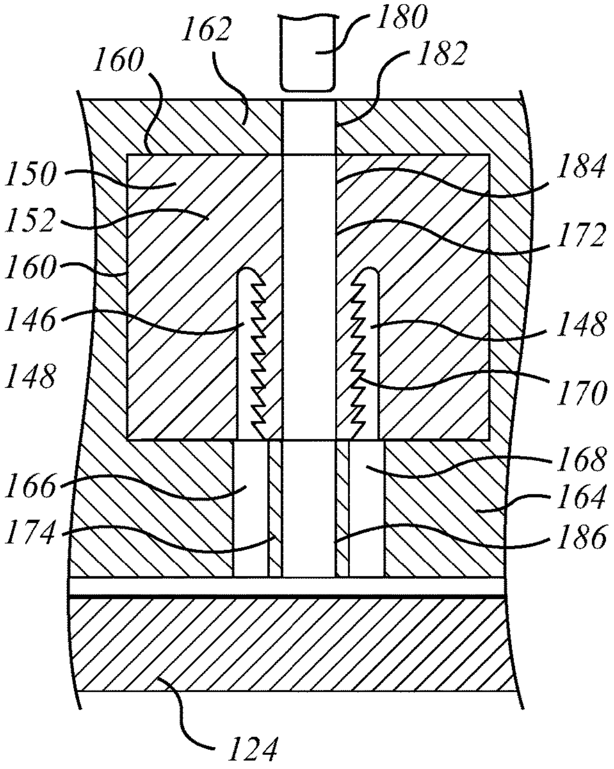
FIG. 12*b* is a view of the molds used to produce the window frame female connector detail of FIG. 11*b* at section '12*b*-12*b*'.
Figure 12C:
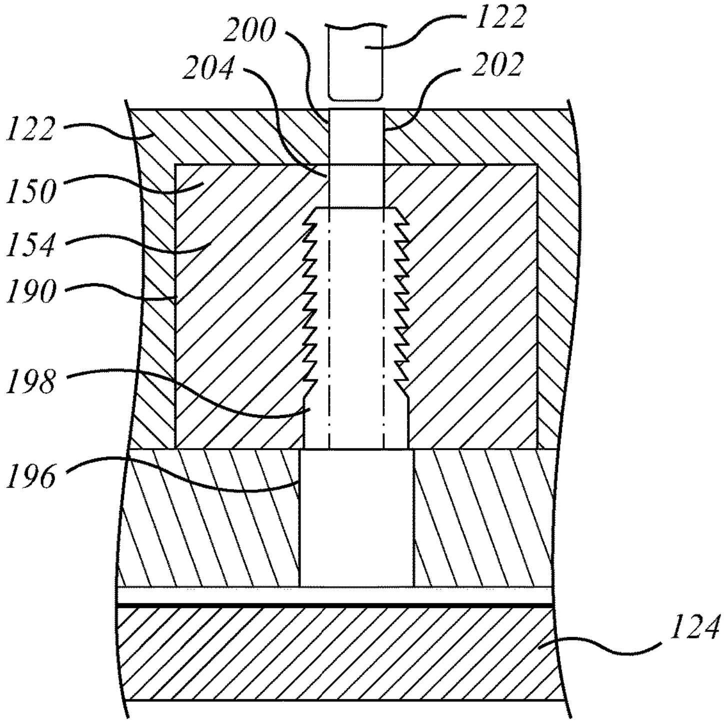
FIG. 12*c* is a view of the molds used to produce the window frame male connector detail of FIG. 11*c* at section '12*c*-12*c'*.

At the locations of the male and female connectors 88, 86, mold 120 has transversely reciprocating third portions or members and fourth portions or members, as may be, referred to generically as inserts 150. In FIGS. 11*b*, 12*a* and 12*b* insert 150 is a female insert 152 for making female connectors 86. In FIGS. 11*c* and 12*c* insert 150 is a male insert 154 used for making male connectors 88. As noted above, inserts 150 need not move perpendicular to the direction of motion of the male mold 124, but can move obliquely. However, it is convenient that the motion be along the x-axis or y-axis, as may be.

At each respective connector location, female mold member 122 has an internal cavity or socket 160 that receives inserts 152 or 154 as may be. The formation of socket 160 results in mold member 122 having layers 162 and 164 that overlie and underlie socket 160, and provide a continuous rigid structural matrix that supports the features and cavities formed therein that define the feature and details of the resultant molded part. In the case of female connectors, the insert 152 has a machined face formed to make an accommodation or cavity 144 that corresponds to the size and shape of end plate 112 that merges with a the cavity or sub-cavity 138 in which stem 76 is formed. Extending laterally away from cavity 144 are a pair of cavities 146, 148 that have the inwardly facing, mutually opposed contoured faces that define barbs 100 and reliefs 102. Corresponding lateral cavities 166, 168 that align with, and merge with cavities 146, 148 as seen in FIG. 12*b*, are provided in layer 162 to form the root portions of legs 92, 94. A tongue of metal 170 then remains in insert 152 between cavities 146, 148; and a corresponding tongue of metal 174 of layer 162 remains between cavities 166, 168. A hollow bore 172 is then formed though layer 164, tongue 170 and tongue 174 to admit an indexing member, which is shown in the example as a pin 180. Bore 172 has three portions 182, 184 and 186 in each of layer 162, 164 and tongue 170. As may be understood, when pin 180 is advanced to occupy portions 182, 184, and 186 it fixes the position of insert 152 relative to first member 122 and, by implication, second member 124.

During molding the tip of pin 180 is flush with, or roughly flush with, the end of bore 172 facing cavity portion 132. After molding is complete, and movable mold member 124 is opened, pin 180 is retracted to allow insert 152 to be translated out, releasing the teeth of female connector 86. Pin 180 can then be advanced again against the inside of first portion 52 of the molded half-frame 22, to extract or eject it from the female mold member 122.

In the context of male connectors 88, looking at FIGS. 11*c* and 12*c*, the stationary mold member 122 once again has a cavity 190 that is the same size as insert 154. As before, mold member 122 has solid structural portions identified as layers 192, 194 that pass above and below insert 154. A roughly square cavity 196 is formed in lower layer 192 which provides the space in which the pedestal 116 of male connector 88 will be formed. A corresponding cavity 198 is formed in insert 154 having the shape of connector 88. Insert 154 is deeper than fitting 88 is tall. A bore 200 is formed through layer 194 and the top of insert 154, centered on cavity 198. Bore 200 has an upper portion 202 in layer 194 and a lower portion 204 in the top of insert 154. When they are aligned (and held in place in aligned position by pin 180) insert 154 cannot move. The presence of pin 180, which ends flush with the bottom of the pedestal, allows male connector 88 to have the form of a hollow centered post, or hollow centered boss, however it may be called. After molding, pin 180 is retracted to release insert 154, which then translates laterally outward to release the form of male connector 88. The movable mold member 124 is then opened and pin 180 is again advanced to eject the finished part from stationary member 122.

To the extent that insert 152 and insert 154 are the same size, (and cavity 190 is the same size as cavity 160), they are interchangeable, permitting the molds to be manufactured and assembled as interchangeable modules allowing the molds to be increased in size to accommodate changes in the height and width of the window. That is, the portion of mold shown in FIG. 11*a* can be a first kind of mold segment, i.e., a segment without any connectors, the portion of mold shown in FIG. 11*b* can be a second type of segment, namely a segment having a female connector cavity; and the portion of mold shown in FIG. 11*c* can be a third type of mold segment, namely a segment having a male connector cavity. Considering the corners of the mold to be a special version of the mold geometry of FIG. 11*a* (except, of course, formed on a corner), it permits any size of mold in the x and y directions to be assembled from the various components in the manner of assembling building bricks. It also permits different arrangement of alternating male and female connectors. It is convenient for that arrangement to result in a reversible part that can act as its own mate when paired with another half-frame of the same connector arrangement. In each case, the molding process includes closing the empty mold of first portion or member 122 and second member 124, by advancing them one-toward-the-other in the z-direction. It also includes advancing inserts 152, 154 by moving them transversely relative to members 122, 124. That motion may be oblique motion with a respective x-direction or y-direction component depending on the side of the frame in question; or it may be perpendicular motion in the x-direction or in the y-direction, as may be, square to members 122, 124. In the example shown, whichever side of the half-frame it may be, the insert is moved laterally inboard. When the inserts 152, 154 are in place (however many there may be), they are locked in place. Locking in place may (and in the example shown does) include advancing a corresponding array of pins through the aligned bores. Once the mold is closed and locked, the plastic feedstock is injected into the mold. The locking is released to permit the transverse extraction of insert 152, 154. In the example shown this involves laterally outboard motion. Also in the example shown, releasing the locking involve axial retraction of pins 180. Once inserts 152, 154 have been disengaged, the movable mold member be it 122, 124 or both, is moved away from its mate, such that the mold haves are separated. Pins 180 may then be advanced again to eject the molded part e.g., from the female mold member. Ejection occurs when pins 180 push on the inside (i.e., the not visible surface) of the molded part so that the external molded part finish that will be visible on installation will not be marred.

The embodiments illustrated and described above illustrate individual non-limiting examples in which the principles of the present invention are employed. It is possible to make other embodiments that employ the principles of the invention and that fall within the following claims. To the extent that the features of those examples are not mutually exclusive of each other, the features of the various embodiments may be mixed-and-matched, i.e., combined, in such manner as may be appropriate, without having to resort to repetitive description of those features in respect of each possible combination or permutation. The invention is not limited to the specific examples or details which are given by way of illustration herein, but only by the claims, as mandated by law. The claims are to be given the benefit of purposive interpretation to include equivalents under the doctrine of equivalents.

Although the various embodiments have been illustrated and described herein, the principles of the present invention are not limited to these specific examples which are given by way of illustration, but only by a purposive reading of the claims.

I claim:

1. A window frame member comprising:

a one-piece molding defining first and second spaced apart transverse members and first and second upright members, said upright members and said transverse members co-operating to form a first four-sided half-frame;

said four-sided half-frame having an outside having an external facing, and an inside;

said inside having an array of molded securement fittings, said molded securement fittings being operable, on installation, to engage corresponding mating fittings of another co-operating half-frame;

said window frame member includes a fascia defined by said external facing, and a peripheral wall extending rearwardly of said fascia;

at least a first female securement fitting that abuts said peripheral wall;

said first female securement fitting including first and second spaced-apart legs that stand rearwardly of said fascia and that co-operate with said peripheral wall;

said window frame member including at least a first plate that co-operates with said first and second legs of said first female securement fitting; and said first plate extends lengthwise beyond said legs of said first female securement fitting, said plate having a distal tip defining an engagement range of travel limit abutment.

2. The window frame member of claim 1 wherein:

said first half-frame has a first direction of formation normal to said external facing;

at least a first of said plurality of molded securement fittings of said first half-frame has at least a second direction of formation;

said second direction of formation is skewed relative to said first direction of formation; and said second direction of formation is at least predominantly transverse to said first direction of formation.

3. The window frame member of claim 2 wherein at least a second of said array of molded securement fittings of said first half-frame has at least a third direction of formation that is different from said first direction of formation and different from said second direction of formation.

4. The window frame member of claim 2 wherein said second direction of formation is square to said first direction of formation.

5. The window frame member of claim 3 wherein said second direction is square to said first direction of formation, and said third direction of formation is square to said first direction of formation and said third direction of formation is square to said second direction of formation.

6. The window frame member of claim 1 wherein at least a first of said molded securement fittings is a first male securement fitting and at least a second of said molded securement fittings is said first female securement fitting, said first male securement fitting and said first female securement fitting having corresponding mating profiles.

7. The window frame member of claim 1 wherein said array of molded securement fittings includes an equal number of male securement fittings and of said female securement fittings.

8. The window frame member of claim 1 wherein said tips of said plates of said window frame member define an array of stops positioned to limit engagement range of said window frame member when said window frame member is mated to another such window frame member.

9. The window frame member of claim 1 wherein said array of molded securement fittings has an axis of symmetry and said window frame member is reversible about said axis of symmetry to mate with another said window frame member that is the same as itself.

10. The window frame member of claim 9 wherein said axis of symmetry is said first direction of formation, and symmetrical translation is by flipping said window frame front-for-back, and rotating said window frame 180 degrees about said axis of symmetry.

11. The window frame member of claim 1 wherein said fittings of said array of securement fittings are barbed to permit engagement in an insert direction and to oppose disengagement in an opposite direction.

12. The window frame member of claim 11 wherein said securement fittings have serrated profiles that define an array of barbs.

13. The window frame member of claim 1 wherein said array of securement fittings includes male securement fittings, said male securement fittings being four-sided in cross-section and being hollow.

14. The window frame member of claim 1 wherein said first female securement fitting has first and second opposed engagement arrays spaced to receive a corresponding male securement fitting.

15. The window frame member of claim 1 wherein at least one of said molded securement fittings abuts said peripheral wall, and said one piece molding has a parting line where said at least one fitting abuts said peripheral wall.

16. The window frame member of claim 1 wherein said window frame member includes a rearwardly depending land connected to an inboard margin of said fascia, said rearwardly depending land being spaced from said peripheral wall.

17. The window frame member of claim 16 wherein said first female securement fitting and said peripheral wall co-operate to form a C-shaped channel section.

18. The window frame member of claim 1 wherein said fascia presents a continuous external surface that is free of mounting fitting fastener penetrations.

19. A pair of first and second window frame members of claim 1 wherein said first and second window frame members are window half-frames that mate together to form a window frame assembly with glazing captured therebetween, said half-frames having mating serrated barb arrays, and said window frame assembly being free of threaded mechanical fasteners.

20. A window frame member comprising:

a unitary molded half-frame having first, second, third and fourth portions;

said first and second portions defining spaced-apart top and bottom transverse members of said half-frame; said third and fourth portions defining spaced apart left hand and right hand upright members of said half-frame;

said first, second, third and fourth portions co-operating to form a four-sided surround of an opening in which to mount glazing;

said half-frame having a forwardly facing fascia, a first rearwardly extending wall terminating in a flange spaced rearwardly from said fascia defining a rearwardly facing land operable to engage the glazing;

each half-frame having a peripheral second wall located laterally outboard of said first rearwardly extending wall and spaced therefrom, said second wall extending rearwardly from said fascia and defining a stem wall relative thereto;

an array of securement fittings rooted to said fascia and spaced about said stem wall;

said array of securement fittings including a set of male securement fittings and a set of female securement fittings, said male securement fittings and said female securement fittings being equal in number and having corresponding mating serrated one-direction engagement serrated profiles;

said female securement fittings fittings each including a pair of legs abutting said stem wall and co-operating therewith to form a C-shaped section;

there being a parting line where an inboard edge of said legs of the female securement fittings meet said stem wall;

said male securement fittings abutting, and merging into, said stem wall, there being a parting line where said male securement fittings meet said stem wall;

there being an array of plates mounted to said stem wall and co-operating with legs of ones of said female securement fittings to form channel sections, said plates defining insert range of travel limit stops;

said half-frame having a first direction of formation normal to said opening of said surround;

said half-frame having at least a second direction of formation on which respective ones of said securement fitting are formed on said first portion of said half-frame, and a third direction of formation on which respective others of said securement fittings are formed on said third portion of said half-frame; and said fascia of said half-frame being free of mechanical fastener penetrations.

21. The window frame member of claim 20 wherein:

said second direction of formation is square to said first direction of formation;

said third direction of formation is square to said first direction of formation and to said second direction of formation;

each of said first, second, third and fourth portions of said half-frame has at least one female securement fitting and at least one male securement fitting; and said half-frame is reversible to mate with another half-frame that is the same to form a window frame assembly with glazing captured between the two half-frames.

22. A window frame member comprising:

a one-piece molding defining first and second spaced apart transverse members and first and second upright members, said upright members and said transverse members co-operating to form a first four-sided half-frame;

said four-sided half-frame having an outside having an external facing, and an inside;

said inside having an array of molded securement fittings, said molded securement fittings being operable, on installation, to engage corresponding mating fittings of another co-operating half-frame;

said first half-frame having a first direction of formation normal to said external facing;

at least a first of said plurality of molded securement fittings of said first half-frame having at least a second direction of formation;

said second direction of formation being skewed relative to said first direction of formation;

said second direction of formation being at least predominantly transverse to said first direction of formation;

said window frame member includes a fascia defined by said external facing, a peripheral wall extending rearwardly of said fascia, and a rearwardly depending land connected to an inboard margin of said fascia, said rearwardly depending land being spaced from said peripheral wall;

at least a first female securement fitting abuts said peripheral wall, said first female securement fitting includes first and second spaced-apart legs that stand rearwardly of said fascia and that co-operate with said peripheral wall to form a C-shaped channel section therewith;

said window frame member includes at least a first plate that co-operates with said first and second legs of said first female securement fitting to form a C-shaped section, said plate is rooted to said peripheral wall, and said plate extends lengthwise beyond said legs of said first female securement fitting, said plate having a distal tip defining an engagement range of travel limit abutment.

23. A window frame member comprising:

a unitary molded half-frame having first, second, third and fourth portions;

said first and second portions defining spaced-apart top and bottom transverse members of said half-frame; said third and fourth portions defining spaced apart left hand and right hand upright members of said half-frame;

said first, second, third and fourth portions co-operating to form a four-sided surround of an opening in which to mount glazing;

said half-frame having a forwardly facing fascia, a first rearwardly extending wall terminating in a flange spaced rearwardly from said fascia defining a rearwardly facing land operable to engage the glazing;

each half-frame having a peripheral second wall located laterally outboard of said first rearwardly extending wall and spaced therefrom, said second wall extending rearwardly from said fascia and defining a stem wall relative thereto;

an array of securement fittings rooted to said fascia and spaced about said stem wall;

said array of securement fittings including a set of male securement fittings and a set of female securement fittings, said male securement fittings and said female securement fittings being equal in number and having corresponding mating serrated one-direction engagement serrated profiles;

said female securement fittings fittings each including a pair of legs abutting said stem wall;

said male securement fittings abutting said stem wall;

there being an array of plates mounted to said stem wall and co-operating with respective legs of ones of said female securement fittings to form channel sections, said plates defining insert range of travel limit stops; and said fascia of said half-frame being free of mechanical fastener penetrations.

* * * * *